(12) United States Patent
Ganti et al.

(10) Patent No.: US 11,315,132 B2
(45) Date of Patent: Apr. 26, 2022

(54) CUSTOMER JOURNEY PREDICTION AND CUSTOMER SEGMENTATION

(71) Applicant: INTERNATIONAL BUSINESS MACHINES CORPORATION, Armonk, NY (US)

(72) Inventors: Raghu Kiran Ganti, Elmsford, NY (US); Dakshi Agrawal, Monsey, NY (US); Mudhakar Srivatsa, White Plains, NY (US); Pranita Dewan, White Plains, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 158 days.

(21) Appl. No.: 16/281,374

(22) Filed: Feb. 21, 2019

(65) Prior Publication Data

US 2020/0273052 A1   Aug. 27, 2020

(51) Int. Cl.
*G06Q 30/02* (2012.01)
*G06N 20/00* (2019.01)

(52) U.S. Cl.
CPC ......... *G06Q 30/0204* (2013.01); *G06N 20/00* (2019.01); *G06Q 30/0202* (2013.01)

(58) Field of Classification Search
None
See application file for complete search history.

(56) References Cited

U.S. PATENT DOCUMENTS

| | | | |
|---|---|---|---|
| 9,843,472 B1 | 12/2017 | Cogan et al. | |
| 10,740,793 B1* | 8/2020 | Sussman | G06Q 30/0277 |
| 2015/0161652 A1* | 6/2015 | Schnabl | G06Q 30/0242 |
| | | | 705/14.41 |
| 2016/0048778 A1 | 2/2016 | Sharon et al. | |
| 2016/0071126 A1* | 3/2016 | Chang | G06N 20/00 |
| | | | 705/7.31 |
| 2016/0210657 A1* | 7/2016 | Chittilappilly | G06Q 30/0246 |
| 2016/0210658 A1* | 7/2016 | Chittilappilly | G06Q 30/0204 |
| 2017/0039233 A1 | 2/2017 | Gauthier et al. | |
| 2017/0039577 A1 | 2/2017 | Gauthier et al. | |
| 2017/0140280 A1 | 2/2017 | Ajmera et al. | |
| 2017/0308917 A1 | 4/2017 | Winters et al. | |
| 2017/0270416 A1* | 9/2017 | Sri | G06Q 30/00 |

(Continued)

FOREIGN PATENT DOCUMENTS

WO    2010048557 A3    10/2009

OTHER PUBLICATIONS

Yazdani et al. "Incremental Recurrent Neural Network Dependency Parser with Search-based Discriminative Training." Proceedings of the 19th Conference on Computational Language Learning, pp. 142-152, Jul. 30-31, 2015. (Year: 2015).*

(Continued)

*Primary Examiner* — Susanna M. Diaz
(74) *Attorney, Agent, or Firm* — Griffiths & Seaton PLLC

(57) ABSTRACT

Embodiments for implementing intelligent customer journey prediction and customer segmentation of a processor in a computing environment. A response outcome of a customer journey for a user may be predicted according to an assigned score based on one or more discriminatory sequence patterns identified between one or more groups of customers using one or more machine learning operations.

18 Claims, 10 Drawing Sheets

(56) References Cited

U.S. PATENT DOCUMENTS

| | | |
|---|---|---|
| 2017/0372347 A1 | 12/2017 | Li et al. |
| 2018/0130068 A1* | 5/2018 | Sampath ............. H04M 3/4217 |
| 2018/0211010 A1* | 7/2018 | Malhotra ............... G16H 50/70 |
| 2018/0268318 A1* | 9/2018 | Matam .................. G06N 20/00 |
| 2019/0034947 A1* | 1/2019 | Rucker .............. G06Q 30/0281 |
| 2019/0065587 A1* | 2/2019 | Lin ....................... G06F 16/958 |
| 2019/0266621 A1* | 8/2019 | Eckman ................ G06F 16/583 |
| 2019/0272553 A1* | 9/2019 | Saini ...................... G06N 7/005 |

OTHER PUBLICATIONS

"Competing on Customer Journeys You have to create new value at every step", by David C. Edelman and Marc Singer. Harvard Business Review, Nov. 2015 (11 Pages).

\* cited by examiner

CUSTOMER JOURNEY PREDICTION AND CUSTOMER SEGMENTATION

BACKGROUND OF THE INVENTION

Field of the Invention

The present invention relates in general to computing systems, and more particularly to, various embodiments for implementing customer journey prediction and customer segmentation in a computing environment by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices. As great strides and advances in technologies come to fruition, these technological advances can be then brought to bear in everyday life. For example, the vast amount of available data made possible by computing and networking technologies may then assist in improvements to quality of life and appropriate living conditions.

SUMMARY OF THE INVENTION

Various embodiments for implementing customer journey prediction and customer segmentation are provided. In one embodiment, by way of example only, a method for implementing intelligent customer journey prediction and customer segmentation, again by a processor in an Internet of Things (IoT) computing environment is provided. A response outcome of a customer journey for a user may be predicted according to an assigned score based on one or more discriminatory sequence patterns identified between one or more groups of customers using one or more machine learning operations.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
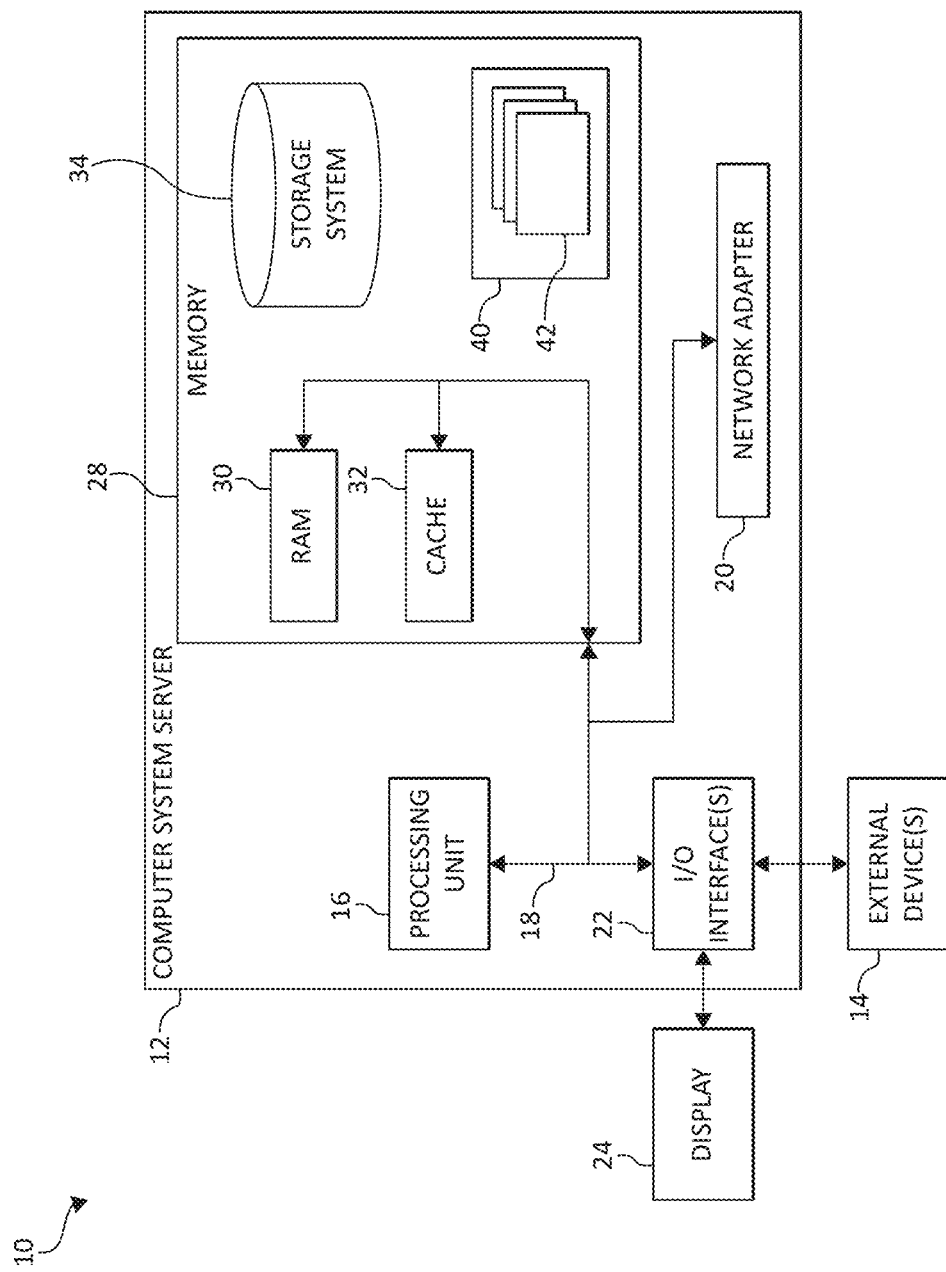
FIG. 1 is a block diagram depicting an exemplary computing node according to an embodiment of the present invention.

The advancement of computing storage and computational power provide the ability to collect large amounts of data, particularly for various types of data relating to various types of entities such as, for example, businesses, organizations, or governments. Moreover, as the amount of electronic information continues to increase, the demand for sophisticated information access systems also grows. Digital or "online" data has become increasingly accessible through real-time, global computer networks. Many data-intensive applications require the extraction of information from data sources, such as, for example, within a business environment.

More specifically, improving productivity, effectiveness, and opportunities of an entity can be an effective operational strategy to drive revenue growth and manage bottom-line expenses. In one aspect, an entity or "enterprise entity" includes, but is not limited to: a private organization (e.g., bank, private company, etc.), a public organization (e.g., public school, government, police/fire department, post office, etc.), non-profit organization, a person, a product, etc. In an additional aspect, an entity may be a client of another entity (e.g., a person is a client of a business or a certain business is a client of another type of business, etc.). Sales productivity, effectiveness, and opportunity are among critical issues for most companies, especially those with a sales force and client-oriented organizations (e.g., consulting companies, insurance companies, software and hardware manufacturers, etc.).

Marketing attribution is the process of quantifying how a set of user marketing touches and responses (e.g., email, chat, visit a site) contributed to a desired outcome, typically revenue or customer satisfaction. A customer journey can be considered as the complete sum of touches and responses that customers go through when interacting with an organization, from initial contact, through purchasing, after sales support, and hopefully onto repurchase and advocacy. As used herein, the term "customer journey" may also mean the interactions of a user/customer with respect to performing a particular task (e.g., shopping, researching, purchasing, comparing, etc.). A "customer journey" may also be defined as a sequence of interactions associated with a specific individual, entity, or decision-making unit (e.g., members of the same family, employee of the same company). A "customer journey" may also include one or more steps or sequences that customers experience, perform, or consider while in engaging with a selected entity (e.g., purchasing or reviewing a product in an online experience, retail experience, or a service, or any combination).

Various industries track a customer journey, for example, through websites or point-of-contacts (e.g., tracking customer clicks, customer calls, etc.). These recorded customer journeys are used for improving the customer experience and business outcomes. For example, some entities may track customer interaction with the entity's call-center and/or website and then use this information such as, for example, to predict churn or if the person will be added to a line/upgrade.

The goal of a customer journey is to understand how customers behave across multiple interactions regardless of channel so that an entity can deliver a consistent exceptional experience. However, as channels and types of interactions increase, resulting in an explosion in the number of different journeys a customer can take, there is a need to understand the intent, motivations, and actions of the customers along with understanding the questions and barriers faced by a customer during their engagement with an entity.

Accordingly, the present invention provides for implementing intelligent customer journey prediction and customer segmentation. A response outcome of a customer journey for a user may be predicted according to an assigned score based on one or more discriminatory sequence patterns identified between one or more groups of customers using one or more machine learning operations. A customer may be segmented based on engagement patterns to understand and capture the motivation and intent of the customer. A root cause analysis may be performed for identifying one or more friction points experienced by the customer by learning the friction points that may adversely affect a customer's actions (e.g., business design or decisions that adversely affect a customer's actions or application/website design or other technical issues posing barriers to the customer's actions).

In one aspect, the present invention provides a solution to predict if a customer will engage in a certain activity dependent on a sequence of events/steps that a user/customer is involved in rather than a single event. The present invention combines frequent sequence mining, which identifies frequently occurring subsequences/sub-steps, with discriminatory analysis to establish a predictive capability of a certain pattern. In one aspect, supervised data such as, for example, sequences and a class that each sequence belongs to may be analyzed. For each class the following steps/actions may be performed. In step 1) determine and mine each frequent subsequence on each class (for prediction). Each frequent subsequence may be a signature. In step 2) each signature may be augmented with timing information. In step 3) a lift may be computed for each mined signature (e.g., a discriminating sequence pattern) with respect to a general population (e.g., a group of customers) and a top K number of signatures may be selected, where K is a positive integer or defined value. In step 4) the signatures may be compressed if a) signature 1 ("s1") is a prefix of signature 2 ("s2". That is, as illustrated in the following pseudo code if:

```
(S1 is prefix of s2)
{if (lifts(s1) < lift (s2)
{accept s1 and s2}
else {reject s2}}
```

To further illustrate the above pseudo code, step 1 computes frequent subsequences for each class (e.g., there may be two classes such as, for example, class A that may be a set of customers/users who purchased a product and class B that may be those customers/users that did not purchase a product). The frequent subsequences are a signature (i.e., a signature is a sequential pattern for each class). For each signature, a lift is computed as a ratio and/or percentage of probability/likelihood of a signature occurring in class A as compared to class B. For example, if a signature "S" occurs in 10% of customer journey in class A and signature "S" occurs in 2% of customer journeys in class B then the lift is 5 (10:2). Several subsequences (e.g., subsequences 1) authenticate a user, subsequences 2) check/determine a bill/price of the user, and subsequences 3) pay the bill by the user) may occur in both classes and thus have very low lift (e.g., low ability to discriminate between the two classes). For compressing the signatures, an operation to identify/prefix relationship between two signatures and require that the longer signature (e.g., signature "abc" comprised of subsequences a, b, and c) has higher lift than its (shorter) prefix signature (e.g., signature "ab" comprised of subsequences a and b). If the requirement condition of the longer signature having higher lift than its (shorter) prefix signature fails, then the longer signature is discarded. In addition to lift, the timing information may be a part of the signature. For example, consider the two sequences ab and abc with lift of 0.78 and 0.8, respectively. Now, the lead time between subsequence c and an event of interest (e.g., deleting a shopping cart) is much smaller than the lead time between subsequence b and the same event of interest, then a signature with lower lift might still be preferred since it allows more time for an action (e.g., sending a coupon to the customer).

In one aspect, the present invention provides for customer segmentation and grouping based on learning discriminating sequence patterns from customer journeys. Semantic tags on each sequence/step (e.g., a uniform resource locator ("URL") click, in-store visit, selecting on a mobile application, etc.) in a customer journey may be assigned, identified, and/or learned. The semantic tags may be assigned, identified, and/or learned using a similarity operation on the clicked document such as, for example, a webpage, transcripts of phone calls, and the like. One or more discriminatory patterns may be identified and/or learned between two distinct groups of customers (satisfied/successful customers or unsatisfied/unsuccessful customers). Each of the discriminatory patterns may be grouped similar to each other (e.g., similarity metrics are incremental coverage and # of common nodes). A score may be generated for a journey based a discriminatory patterned learned on a current customer journey to predict likelihood of customer following a given pattern of behavior. That is, a discriminatory pattern identified from a current customer journey for a customer may be compared to previously learned discriminatory patterns (which may be in the form of one or more discriminatory pattern models). A score may be assigned to the current customer journey based on the comparison.

It should be noted that the customer journey may be used to predict (e.g., via a score) a satisfied/successful response outcome (e.g., "success metrics" representing a satisfied or "happy" customer) that may be set of metrics, one more sequences/steps, or a combination thereof which indicates a successful response or success level of a journey. Examples of satisfied/successful metrics can include, but are not limited to, for example, purchasing or ordering a product or service, reviewing or comparing a product, registering with an entity for a membership or referral campaign, providing contact information for receiving correspondence (e.g., advertisements, sales, promotions, subscribing to an email list, etc.) from an entity, providing positive feedback for a purchase or experience with an entity, becoming an advocate for a brand, and so forth.

The customer journey may also include an unsatisfied/unsuccessful response outcome (e.g., "unsuccess metrics" representing an unsatisfied or "unhappy" customer) that may be set of metrics, one more sequences/steps, or a combination thereof which indicates an unsatisfied/unsuccessful response or unsuccess level of a journey. Examples of failure metrics can include, but are not limited to, for example, an abandon cart, negative feedback on a website, removing contact information from an entity (e.g., unsubscribing to an email list), becoming a detractor for the brand, returning a product, requesting a refund, calling customer service for a repair or complaint, and so forth. Thus, a "successful journey" or "successful response outcome" is a journey that ends with a success metric (e.g., a positive or preferred response). An "unsuccessful journey" or "unsuccessful response outcome" is a journey that ends with a failure metric. It is to be appreciated that there can be journeys which are neither successful nor unsuccessful, but instead are in a pending state waiting for a new interaction to happen.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
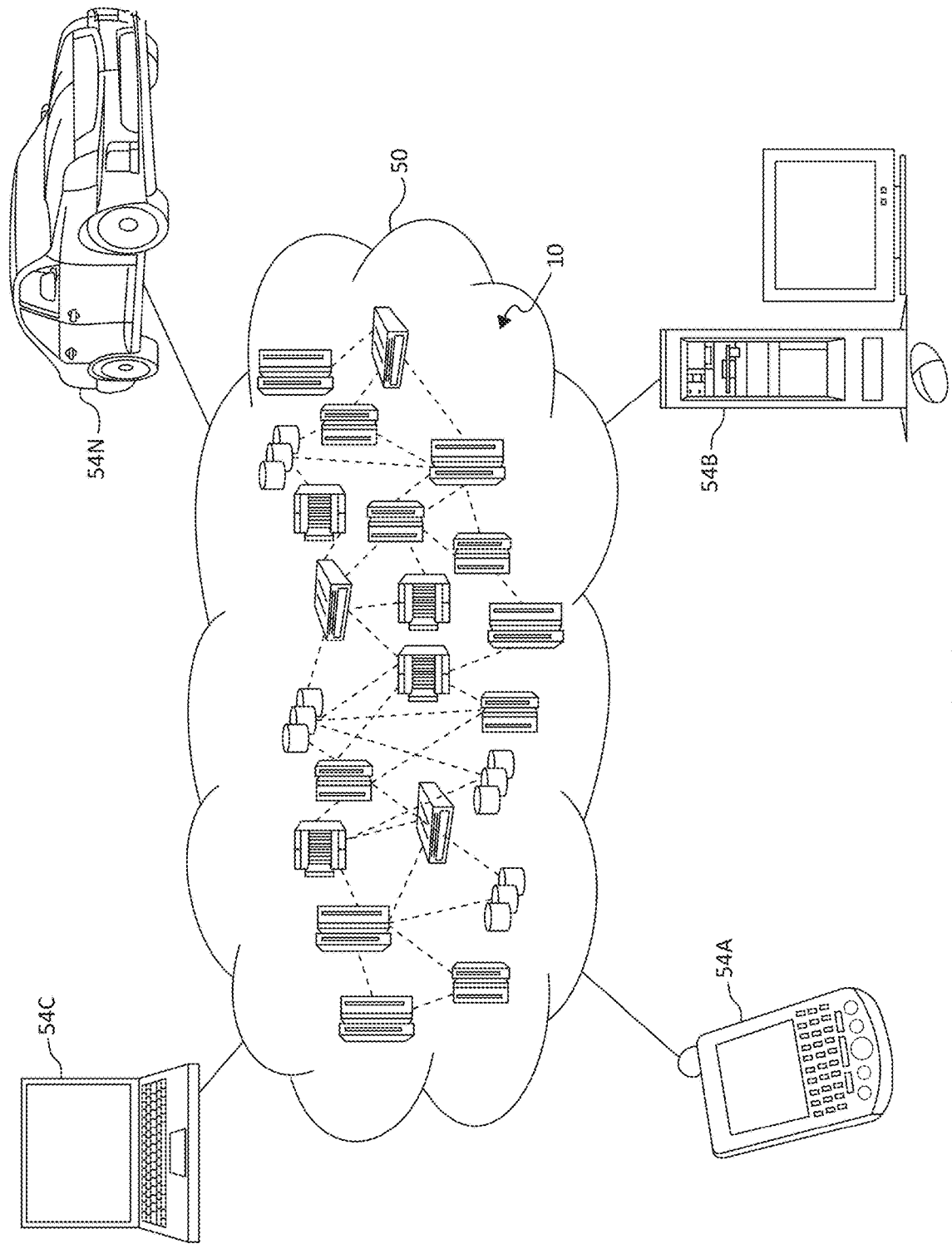
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
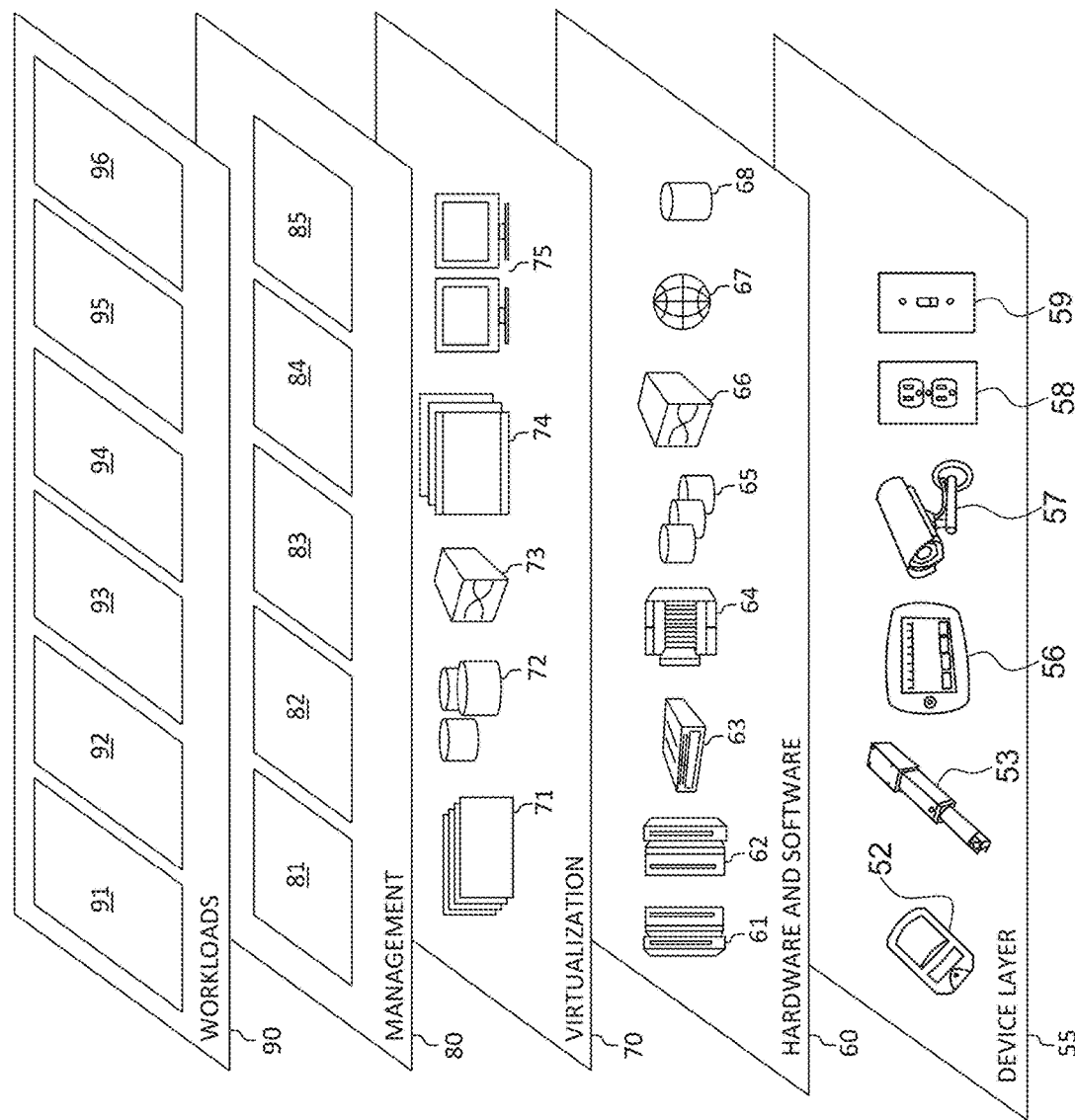
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96. In addition, workloads and functions 96 for implementing customer journey prediction and customer segmentation may include such operations as data analytics, data analysis, and as will be further described, notification functionality. One of ordinary skill in the art will appreciate that the workloads and functions 96 for implementing customer journey prediction and customer segmentation may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
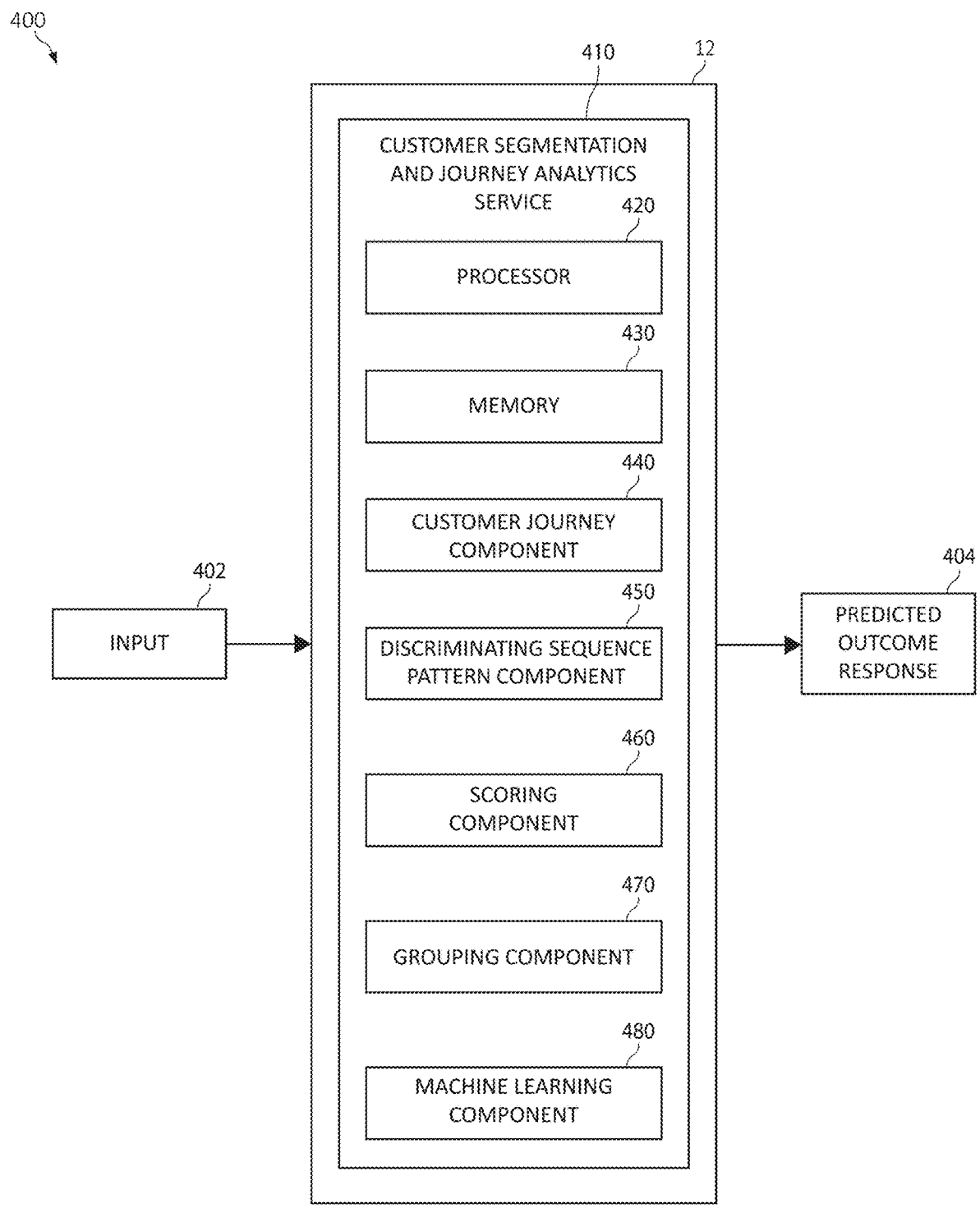
FIG. 4 is an additional block diagram depicting an exemplary functional relationship between various aspects of the present invention.

Turning now to FIG. 4, a block diagram depicting exemplary functional components of a cognitive system 400 according to various mechanisms of the illustrated embodiments, is shown. In one aspect, one or more of the components, modules, services, applications, and/or functions described in FIGS. 1-3 may be used in FIG. 4.

A customer segmentation and journey analytics service 410 is shown, incorporating processing unit ("processor") 420 to perform various computational, data processing and other functionality in accordance with various aspects of the present invention. The customer segmentation and journey analytics service 410 may be provided by the computer system/server 12 of FIG. 1. The processing unit 420 may be in communication with memory 430. As one of ordinary skill in the art will appreciate, the depiction of the various functional units in customer segmentation and journey analytics service 410 is for purposes of illustration, as the functional units may be located within the customer segmentation and journey analytics service 410 or elsewhere within and/or between distributed computing components.

The customer segmentation and journey analytics service 410 may also include a customer journey component 440, a discriminating sequence pattern component 450, a scoring component 460, a grouping component 470, and a machine learning component 480 is shown, each of which may also be in communication with and/or controlled by the processor 420. The customer journey component 440, the discriminating sequence pattern component 450, and the scoring component 460, the grouping component 470, and the machine learning component 480 may each work in concert with processing unit 420 and memory 430 to accomplish various aspects of the present invention.

The customer journey component 440, the discriminating sequence pattern component 450, and the scoring component 460 may each undergo various data analytics functions associated with the customer segmentation and journey analytics service 410. As one of ordinary skill in the art will appreciate, the customer journey component 440, the discriminating sequence pattern component 450, the scoring component 460, the grouping component 470, and/or the machine learning component 480 may each implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In one aspect, the customer journey component 440 may receiving input data 402 and predict a response outcome of a customer journey for a user (e.g., a customer) according to an assigned score, generated by the scoring component 460, based on one or more discriminatory sequence patterns identified by the discriminating sequence pattern component 450 between one or more groups of customers using one or more machine learning operations of the machine learning component. The customer journey component may provide the prediction as the predicted outcome response 404.

Additionally, in association with the customer journey component 440, the discriminating sequence pattern component 450 may identify one or more friction points associated with the customer journey. That is, the discriminating sequence pattern component 450 may identify and learn the one or more discriminatory sequence patterns (e.g., a signature) of each customer journey of each customer.

The discriminating sequence pattern component 450 may learn a successful response outcome of each customer journey generated from a first discriminatory sequence pattern associated with a first group of customers. Alternatively, the discriminating sequence pattern component 450 may learn an unsuccessful response outcome of each customer journey generated from a second discriminatory sequence pattern associated with a second group of customers.

The discriminating sequence pattern component 450 may learn discriminating sequence patterns between customer journeys with different outcomes (e.g., whether the customer purchased or did purchase product "X"). The discriminating sequence pattern component 450 may divide the input data 402 into two or more groups (e.g., "buckets") (e.g., with two buckets, one being a preferred/desired outcome and the other a non-preferred/undesired outcome). A sequential pattern mining operation (e.g., a prefix span operation) may be performed for learning frequent subsequences in one group/bucket such as, for example, by identifying statistically relevant patterns between data samples where the values are delivered in a sequence. The discriminating sequence pattern component 450 may eliminate duplicate/extraneous subsequences from learned subsequences. The discriminating sequence pattern component 450 may compute lift as a probability of sequences occurring (e.g., the likelihood of subsequences occurring) in a first group/bucket when compared to those occurring in a second group/bucket or the remaining groups/buckets.

Additionally, in association with the machine learning component 480, the discriminating sequence pattern component 450 may learn discriminating sequence patterns between customer journeys by comparing multiple discrimination sequence pattern models using one or more various distance algorithms, such as, for example, 1) string edit distance (Demerau-Levenshtein distance), 2) dynamic time warping ("DTW") (e.g., Sakoe-Chiba, Itakura parallelogram), 3) Earth Mover Distance ("EMD") (e.g., Jaro-Winkler distance), and/or 4) neural network embedding (for fuzzy matches) between sequences of words.

In one aspect, for neural network embedding for fuzzy matching, the URL names of similar internet/web pages can be different (e.g., Acme product 2.0 and Acme product 2.2). The semantic similarity between internet/web pages may be learned using vector embeddings computed on the sequence neighborhood and content of a URL. Satisfied/successful customers paths (e.g., happy customer paths) and unsatisfied/unsuccessful paths (e.g., unhappy customer paths) may be converted into a sequence of vector embeddings. A distance algorithm (e.g., DTW) may be applied and used to measure distance between satisfied/successful customers paths and unsatisfied/unsuccessful paths with a distance measure as cosine distance between vectors.

The grouping component 470 may group together similar discriminatory sequence patterns according to one or more similarity metrics, a grouping strategy, or a combination thereof. That is, multiple subsequences may be grouped together based on incremental coverage such as, for example, by grouping strategies (e.g., largest coverage, largest lift, and/or by grouping lift and group coverages that have been determined/computed.

The scoring component 460 may assign a score to the customer journey according to a number of sequences of the one or more discriminatory sequence patterns. The score of a selected journey (e.g., online scoring) may be determined/computed by matching against learned subsequences and/or groups (e.g., classes). One or more scoring strategies such as, for example, a number of subsequences matched and/or a sum of lifts of subsequences matched may be used.

The machine learning component 480, in association with the customer journey component 440, may assign one or more semantic tags associated with each sequence performed during the customer journey by the user. The semantic tags may assist in identifying similar actions performed by both the user and the one or more groups of customers for identifying and learning the one or more discriminatory sequence patterns.

By way of example only, the machine learning component 480 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
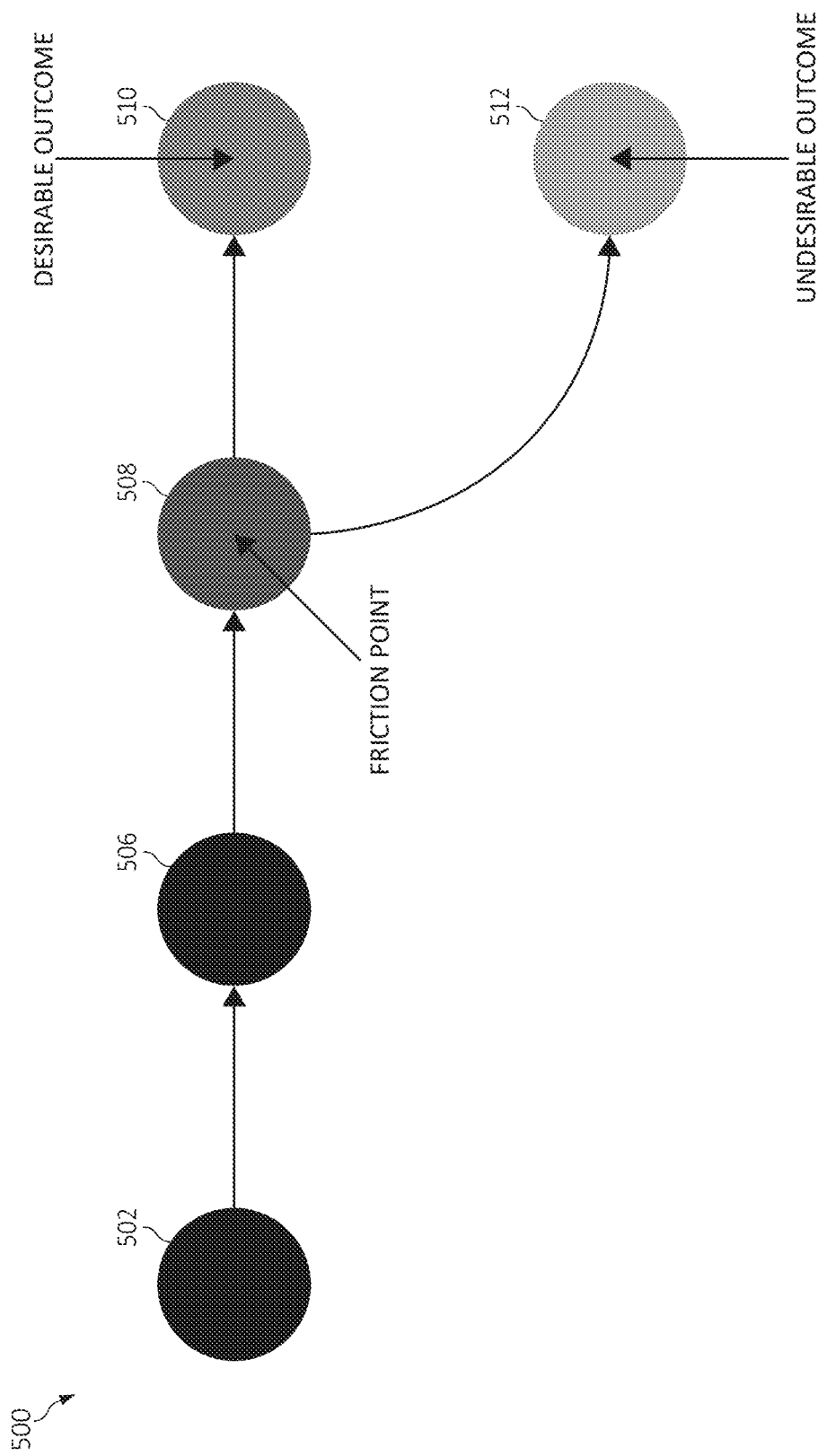
FIG. 5 is an additional block diagram depicting friction points of a customer journey by a processor in which aspects of the present invention may be realized.

Turning now to FIG. 5, block diagram 500 depicts the operations for identifying friction points associated with a customer journey. In one aspect, one or more of the components, modules, services, applications, and/or functions described in FIGS. 1-4 may be used in FIG. 5.

As illustrated, a customer may interact with an entity (e.g., using a website of a business) by one or more sequences of events such as, for example, sequence 502, 506, and 508. However, sequence 508 may be identified as a "friction point" in the series sequences. From sequence 508 (e.g., a friction point), a desirable outcome 510 (e.g., successful response outcome) may be generated and/or predicted. Alternatively, from sequence 508 (e.g., a friction point), an undesirable outcome 512 (e.g., unsuccessful response outcome) may be generated and/or predicted.

Figure 6:
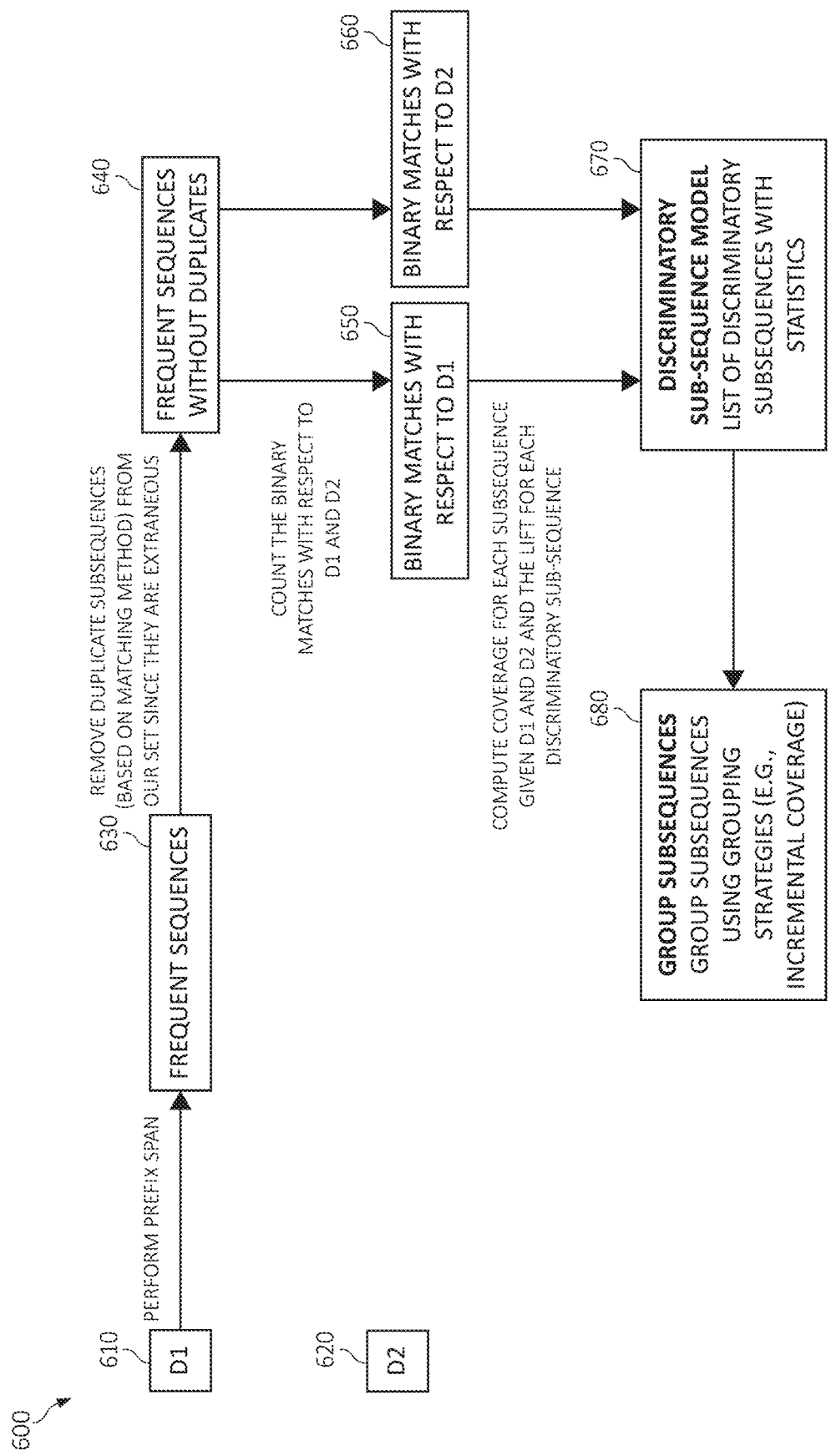
FIG. 6 is a block diagram for using of a training algorithm for customer journey prediction and customer segmentation in a computing environment by a processor in which aspects of the present invention may be realized.

Turning now to FIG. 6, a block diagram of exemplary functionality 600 relating to a training algorithm for learn discriminating sequence patterns between two sets of data (e.g., "D1" and "D2") for customer journey prediction and customer segmentation is depicted according to various aspects of the present invention. As shown, the various blocks of functionality are depicted with arrows designating the blocks' 600 relationships with each other and to show process flow. Additionally, descriptive information is also seen relating each of the functional blocks 600. As will be seen, many of the functional blocks may also be considered "modules" of functionality, in the same descriptive sense as has been previously described in FIG. 1-5. With the foregoing in mind, the module blocks 600 may also be incorporated into various hardware and software components of a system for customer journey prediction and customer segmentation in accordance with the present invention. Many of the functional blocks 600 may execute as background processes on various components, either in distributed computing components, or on the user device, or elsewhere.

Starting in block 610, data D1 may be received and a sequential pattern mining operation (e.g., a prefix span operation) may be performed for learning frequent subsequences 630. Duplicate/extraneous subsequences may be removed (based on matching operation) from the set of frequent sequences. In block 640, frequent sequences without duplicates may be used to count a number of binary matches with response to D1 (from block 610) and D2 (from block 620) may be performed. That is, a number of frequent sequences without duplicates in D1 (from block 610) are compared with D2 (from block 620).

In block 650, those of the binary matches of frequent sequences with respect to D1 may be identified and grouped into a first group. In block 660, the number of binary matches with respect to D2 may be identified and grouped into a second group.

In block 670, an amount of coverage for each subsequence for D1 and D2 may be determined/computed and lift for each discriminatory subsequence may be provided in a discriminatory subsequence model. The list of discriminatory subsequences with statistics may be used to group subsequences, as in block 680. That is, the discriminatory subsequences may be grouped using one or more grouping strategies (e.g., incremental coverage). Grouping via incremental coverage can be calculated using a greedy strategy as follows. In step 1) select a subsequence S with the highest lift. In step 2) compute incremental coverage for subsequence as illustrated in the following equation:

$$\frac{|\text{coverage}(s') - \text{coverage}(S)|}{\text{number of customers}}, \quad (1)$$

where coverage(S) is the set of all customer whose journey matches subsequence S (e.g., a set of customers that match subsequence S' but not subsequence S). In step 3) add all subsequences S' whose incremental coverage with respect to subsequence S is below a threshold. In step 4, the operations from step 1 are repeated by picking the next group head (e.g., the subsequence with the highest lift that is not yet grouped (if there exists a group head, otherwise the steps/operations are terminated)).

Figure 7:
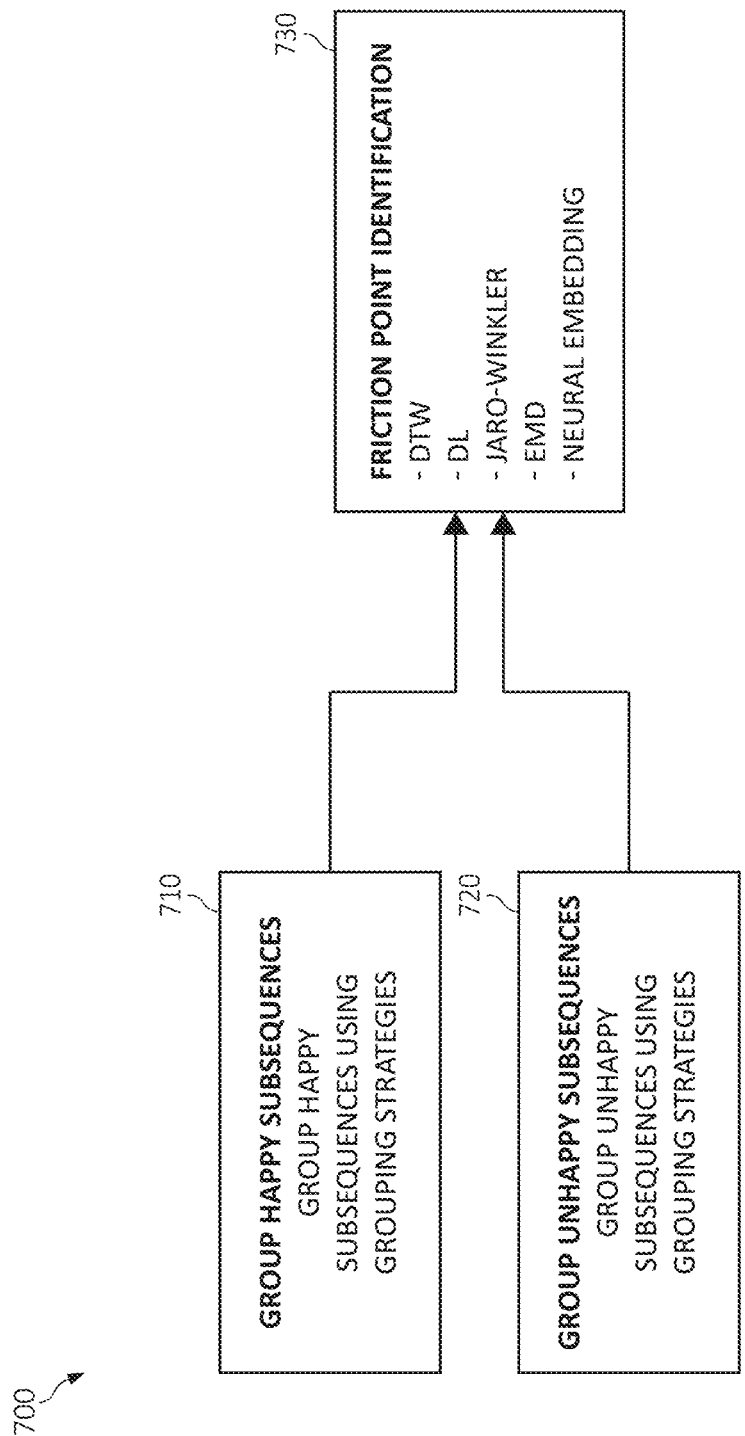
FIG. 7 is a block diagram for identifying of friction points from sequences of a customer journey in a computing environment by a processor in which aspects of the present invention may be realized.

Turning now to FIG. 7, a block diagram of exemplary functionality 700 relating to difference sequence pattern identification of a customer journey is depicted according to various aspects of the present invention. In one aspect, one or more of the components, modules, services, applications, and/or functions described in FIGS. 1-6 may be used in FIG. 7.

In block 710, customer journeys having one or more similar subsequences patterns (e.g., subsequences of satisfied customers) may be identified and grouped together using one or more grouping strategies. In block 720, customer journeys having one or more similar subsequences patterns (e.g., subsequences of satisfied customers) may be identified and grouped together using one or more grouping strategies. From block 710 and 720, one or more friction points may be identified using one or more various distance algorithms. In particular, to capture distances between related events in a customer journey the invention suggests using neural embeddings obtained from the event's description (e.g., if the event is visiting Acme Product 2.0 web page, then a neural embeddings of the text content of this page is used for compute event-event distances (e.g., between Acme Product 2.0 and Acme Product 2.2 and Acme Product 2.4), which ultimately improves distance computation between two sequences.

Figure 8:
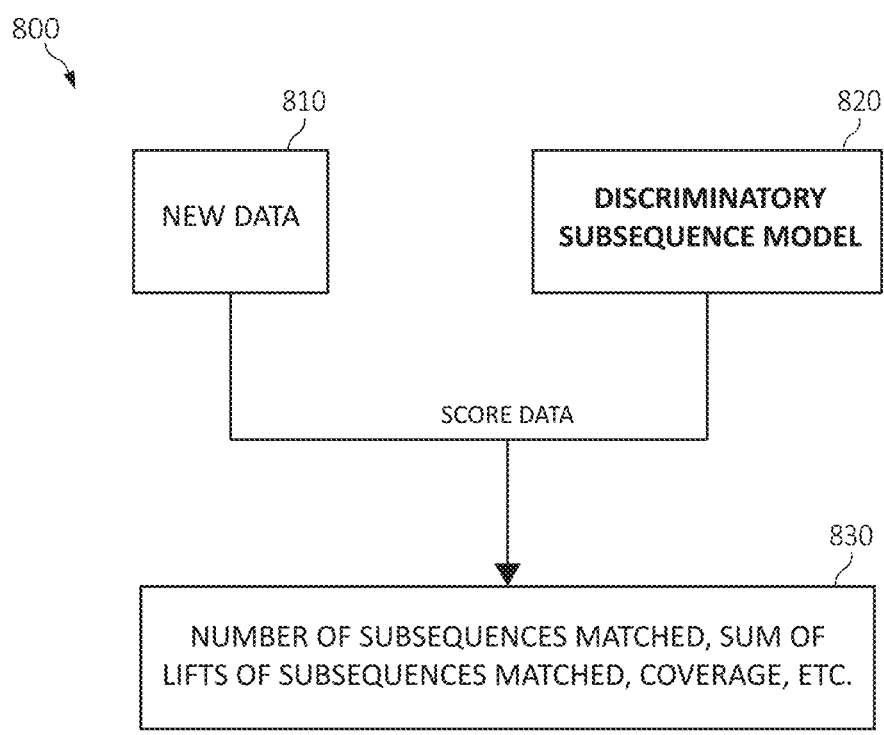
FIG. 8 is a block diagram for scoring a customer journey for customer journey prediction and customer segmentation in a computing environment by a processor in which aspects of the present invention may be realized.

Turning now to FIG. 8, a block diagram of exemplary functionality 800 for scoring a customer journey for customer journey prediction and customer segmentation is depicted according to various aspects of the present invention. In one aspect, one or more of the components, modules, services, applications, and/or functions described in FIGS. 1-7 may be used in FIG. 8.

In block 810, new data (which may be data associated with one or more sequences and actions of a customer journey) may be compared with a discriminatory subsequence model 820. The data may be scored based on a number of matching subsequences, a sum of lists of matching subsequences, coverage, and the like, as in block 830.

Figure 9:
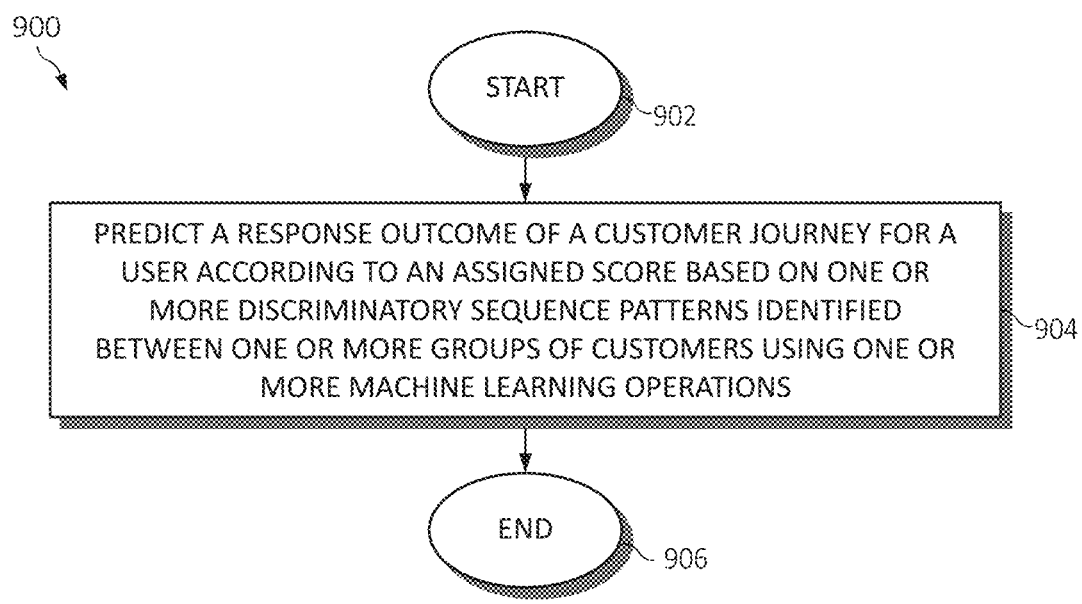
FIG. 9 is a flowchart diagram depicting an exemplary method for implementing intelligent customer journey prediction and customer segmentation in a computing environment by a processor in which aspects of the present invention may be realized.

Turning now to FIG. 9, a method 900 for implementing intelligent customer journey prediction and customer segmentation in a computing environment by a processor is depicted, in which various aspects of the illustrated embodiments may be implemented. The functionality 900 may be implemented as a method executed as instructions on a machine, where the instructions are included on at least one computer readable medium or one non-transitory machine-readable storage medium. The functionality 900 may start in block 902.

A response outcome of a customer journey for a user may be predicted according to an assigned score based on one or more discriminatory sequence patterns identified between one or more groups of customers using one or more machine learning operations, as in block 904. The functionality 900 may end, as in block 906.

Figure 10:
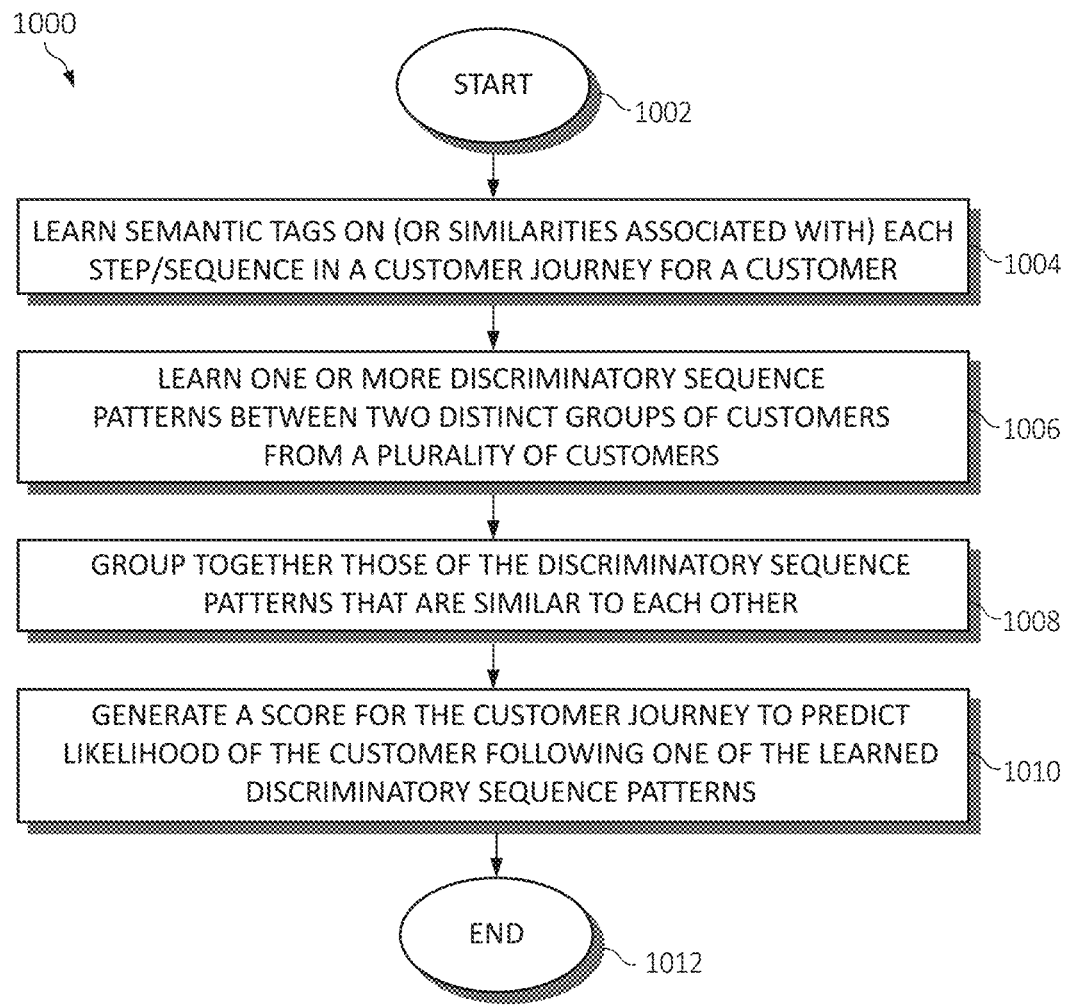
FIG. 10 is an additional flowchart diagram depicting an exemplary method for implementing intelligent customer journey prediction and customer segmentation in a computing environment by a processor, again in which aspects of the present invention may be realized.

Turning now to FIG. 10, a method 1000 for implementing intelligent customer journey prediction and customer segmentation in a computing environment by a processor is depicted, in which various aspects of the illustrated embodiments may be implemented. The functionality 1000 may be implemented as a method executed as instructions on a machine, where the instructions are included on at least one computer readable medium or one non-transitory machine-readable storage medium. The functionality 1000 may start in block 1002.

Semantic tags may be learned on (or similarities associated with) each step/sequence in a customer journey for a customer/user, as in block 1004. One or more discriminatory sequence patterns may be learned between two distinct groups (e.g., classes) of customers/users from the plurality of customers/users, as in block 1006. Those of the discriminatory sequence patterns that are similar to each other may be grouped together, as in block 1008. A score (which may a reflection of, an indication, or value representing one of the grouped discriminatory sequence patterns) for the customer journey may be generated to predict likelihood (e.g., percentage or value above a selected threshold) of the customer following one of the learned discriminatory sequence patterns, as in block 1010. The functionality 1000 may end, as in block 1012.

In one aspect, in conjunction with and/or as part of at least one block of FIGS. 9 and/or 10, the operations of methods 900 and/or 1000 may include each of the following. The operations of method 900 and/or 1000 may identify one or more friction points on of the customer journey, and/or identify and learn the one or more discriminatory sequence patterns of each customer journey of each customer.

The operations of method 900 and/or 1000 may learn a successful response outcome of each customer journey generated from a first discriminatory sequence pattern associated with a first group of customers, and/or learn an unsuccessful response outcome of each customer journey generated from a second discriminatory sequence pattern associated with a second group of customers. The operations of method 900 and/or 1000 may assign one or more \ tags associated with each sequence performed during the customer journey by the user. The semantic tags assist in identifying similar actions performed by both the user and the one or more groups of customers for identifying and learning the one or more discriminatory sequence patterns.

The operations of method 900 and/or 1000 may group together similar discriminatory sequence patterns according to one or more similarity metrics, a grouping strategy, or a combination thereof and assign the score to the customer journey according to a number of sequences of the one or more discriminatory sequence patterns.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing intelligent customer journey prediction and customer segmentation in a computing environment by a processor, comprising:
   receiving data representative of a customer journey for each of a plurality of customers by a computing device, wherein the customer journey is a plurality of actions sequentially undertaken by a respective one of the plurality of customers with respect to a potential purchase of goods or services of an entity;
   training a neural network using the data to identify one or more discriminatory sequence patterns of those of the plurality of actions of the customer journey of the respective one of the plurality of customers that is similar to the plurality of actions sequentially taken by others of the plurality of customers, wherein the neural network groups those of the plurality of customers having similar customer journeys into one or more groups of customers using neural embeddings obtained from an event description of the plurality of actions, and wherein training the neural network includes:
   performing a sequential pattern mining operation to determine similar discriminatory sequence patterns of the one or more discriminatory sequence patterns,
   grouping those of the similar discriminatory patterns into the one or more groups of customers according to binary matches within the similar discriminatory patterns,
   within each group, computing incremental coverage for each discriminatory subsequence of the one or more discriminatory sequence patterns, and
   adding those of the discriminatory subsequences having the incremental coverage below a predefined threshold to one of the classes;
   in conjunction with grouping those of the similar discriminatory sequence patterns into the one or more groups of customers, computing a lift of a signature of each of the one or more discriminatory sequence patterns as a ratio that the signature of a first one of the one or more discriminatory sequence patterns occurring in a first one of the classes also occurs in a second one of the one or more discriminatory sequence patterns in a second one of the classes, wherein the lift of the signature is used to determine when to compress the signature and when to discard the signature, and wherein timing information of the signature with respect to an event of interest is augmented to the signature such that the timing information is used to assign an importance to the signature as compared with an alternative signature notwithstanding whether the signature has a lower computed lift with respect to the alternative signature;
   predicting a response outcome of the customer journey for a user according to an assigned score based on the one or more discriminatory sequence patterns identified between the one or more of the groups of customers using the trained neural network; and
   displaying the predicted response outcome of the customer journey on a display associated with the computing device.

2. The method of claim 1, further including identifying one or more friction points on of the customer journey.

3. The method of claim 1, further including:
   learning a successful response outcome of each customer journey generated from a first discriminatory sequence pattern associated with a first group of customers; or
   learning an unsuccessful response outcome of each customer journey generated from a second discriminatory sequence pattern associated with a second group of customers.

4. The method of claim 1, further including assigning one or more semantic tags associated with each sequence performed during the customer journey by the user, wherein the one or more semantic tags assist in identifying similar actions performed by both the user and the one or more groups of customers for identifying and learning the one or more discriminatory sequence patterns.

5. The method of claim 1, further including grouping together the similar discriminatory sequence patterns according to one or more similarity metrics, a grouping strategy, or a combination thereof.

6. The method of claim 1, further including assigning the score to the customer journey according to a number of sequences of the one or more discriminatory sequence patterns.

7. A system for implementing intelligent customer journey prediction and customer segmentation in a computing environment, comprising:
one or more computers with executable instructions that when executed cause the system to:
receive data representative of a customer journey for each of a plurality of customers by the one or more computers, wherein the customer journey is a plurality of actions sequentially undertaken by a respective one of the plurality of customers with respect to a potential purchase of goods or services of an entity;
train a neural network using the data to identify one or more discriminatory sequence patterns of those of the plurality of actions of the customer journey of the respective one of the plurality of customers that is similar to the plurality of actions sequentially taken by others of the plurality of customers, wherein the neural network groups those of the plurality of customers having similar customer journeys into one or more groups of customers using neural embeddings obtained from an event description of the plurality of actions, and wherein training the neural network includes:
performing a sequential pattern mining operation to determine similar discriminatory sequence patterns of the one or more discriminatory sequence patterns,
grouping those of the similar discriminatory patterns into the one or more groups of customers according to binary matches within the similar discriminatory patterns,
within each group, computing incremental coverage for each discriminatory subsequence of the one or more discriminatory sequence patterns, and
adding those of the discriminatory subsequences having the incremental coverage below a predefined threshold to one of the classes;
in conjunction with grouping those of the similar discriminatory sequence patterns into the one or more groups of customers, compute a lift of a signature of each of the one or more discriminatory sequence patterns as a ratio that the signature of a first one of the one or more discriminatory sequence patterns occurring in a first one of the classes also occurs in a second one of the one or more discriminatory sequence patterns in a second one of the classes, wherein the lift of the signature is used to determine when to compress the signature and when to discard the signature, and wherein timing information of the signature with respect to an event of interest is augmented to the signature such that the timing information is used to assign an importance to the signature as compared with an alternative signature notwithstanding whether the signature has a lower computed lift with respect to the alternative signature;
predict a response outcome of the customer journey for a user according to an assigned score based on the one or more discriminatory sequence patterns identified between the one or more of the groups of customers using the trained neural network; and
display the predicted response outcome of the customer journey on a display associated with the one or more computers.

8. The system of claim 7, wherein the executable instructions further identify one or more friction points on of the customer journey.

9. The system of claim 7, wherein the executable instructions further:
learn a successful response outcome of each customer journey generated from a first discriminatory sequence pattern associated with a first group of customers; or
learn an unsuccessful response outcome of each customer journey generated from a second discriminatory sequence pattern associated with a second group of customers.

10. The system of claim 7, wherein the executable instructions further assign one or more semantic tags associated with each sequence performed during the customer journey by the user, wherein the one or more semantic tags assist in identifying similar actions performed by both the user and the one or more groups of customers for identifying and learning the one or more discriminatory sequence patterns.

11. The system of claim 7, wherein the executable instructions further group together the similar discriminatory sequence patterns according to one or more similarity metrics, a grouping strategy, or a combination thereof.

12. The system of claim 7, wherein the executable instructions further assigning the score to the customer journey according to a number of sequences of the one or more discriminatory sequence patterns.

13. A computer program product for, by a processor, implementing intelligent customer journey prediction and customer segmentation, the computer program product comprising a non-transitory computer-readable storage medium having computer-readable program code portions stored therein, the computer-readable program code portions comprising:
an executable portion that receives data representative of a customer journey for each of a plurality of customers by a computing device, wherein the customer journey is a plurality of actions sequentially undertaken by a respective one of the plurality of customers with respect to a potential purchase of goods or services of an entity;
an executable portion that trains a neural network using the data to identify one or more discriminatory sequence patterns of those of the plurality of actions of the customer journey of the respective one of the plurality of customers that is similar to the plurality of actions sequentially taken by others of the plurality of customers, wherein the neural network groups those of the plurality of customers having similar customer journeys into one or more groups of customers using neural embeddings obtained from an event description of the plurality of actions, and wherein training the neural network includes:
performing a sequential pattern mining operation to determine similar discriminatory sequence patterns of the one or more discriminatory sequence patterns,
grouping those of the similar discriminatory patterns into the one or more groups of customers according to binary matches within the similar discriminatory patterns,
within each group, computing incremental coverage for each discriminatory subsequence of the one or more discriminatory sequence patterns, and
adding those of the discriminatory subsequences having the incremental coverage below a predefined threshold to one of the classes;
an executable portion that, in conjunction with grouping those of the similar discriminatory sequence patterns into the one or more groups of customers, computes a lift of a signature of each of the one or more discriminatory sequence patterns as a ratio that the signature of a first one of the one or more discriminatory sequence patterns occurring in a first one of the classes also occurs in a second one of the one or more discriminatory sequence patterns in a second one of the classes, wherein the lift of the signature is used to determine when to compress the signature and when to discard the signature, and wherein timing information of the signature with respect to an event of interest is augmented to the signature such that the timing information is used to assign an importance to the signature as compared with an alternative signature notwithstanding whether the signature has a lower computed lift with respect to the alternative signature;

an executable portion that predicts a response outcome of the customer journey for a user according to an assigned score based on the one or more discriminatory sequence patterns identified between the one or more of the groups of customers using the trained neural network; and an executable portion that displays the predicted response outcome of the customer journey on a display associated with the computing device.

14. The computer program product of claim 13, further including an executable portion that identifies one or more friction points on of the customer journey.

15. The computer program product of claim 13, further including an executable portion that:
   learns a successful response outcome of each customer journey generated from a first discriminatory sequence pattern associated with a first group of customers; or
   learns an unsuccessful response outcome of each customer journey generated from a second discriminatory sequence pattern associated with a second group of customers.

16. The computer program product of claim 13, further including an executable portion that assigns one or more semantic tags associated with each sequence performed during the customer journey by the user, wherein the one or more semantic tags assist in identifying similar actions performed by both the user and the one or more groups of customers for identifying and learning the one or more discriminatory sequence patterns.

17. The computer program product of claim 13, further including an executable portion that groups together the similar discriminatory sequence patterns according to one or more similarity metrics, a grouping strategy, or a combination thereof.

18. The computer program product of claim 13, further including an executable portion that assigns the score to the customer journey according to a number of sequences of the one or more discriminatory sequence patterns.

* * * * *